United States Patent [19]

Bose et al.

[11] Patent Number: 4,952,441

[45] Date of Patent: Aug. 28, 1990

[54] THERMAL INSULATION BATT

[75] Inventors: Ajit K. Bose, Lawrenceville; Joseph J. Schulte, Mountain Lakes, both of N.J.

[73] Assignee: Union Camp Corporation, Wayne, N.J.

[21] Appl. No.: 154,159

[22] Filed: Feb. 9, 1988

[51] Int. Cl.⁵ .......................... B32B 3/04; B32B 3/06; E04B 1/74
[52] U.S. Cl. ...................... 428/121; 52/404; 52/406; 52/743; 428/126; 428/157; 428/191; 428/201; 428/211; 428/339
[58] Field of Search ............... 52/404, 406, 743; 428/121, 124, 126, 157, 191, 201, 211, 339

[56] References Cited

U.S. PATENT DOCUMENTS

| | | | |
|---|---|---|---|
| 2,028,253 | 1/1936 | Spafford | 52/406 |
| 2,263,201 | 11/1941 | Wheeler et al. | 52/404 |
| 2,271,575 | 2/1942 | Waterman | 428/121 |
| 2,335,220 | 11/1943 | Edwards | 428/121 |
| 2,749,262 | 6/1956 | Wiser | 428/124 |
| 2,913,104 | 11/1959 | Parker | 52/406 |
| 3,318,063 | 5/1967 | Stone et al. | 428/124 |
| 3,729,879 | 5/1973 | Franklin | 52/406 |
| 4,233,791 | 11/1980 | Kuhl et al. | 52/404 |
| 4,569,174 | 2/1986 | Bossany | 52/404 |
| 4,709,523 | 12/1987 | Broderick et al. | 52/406 |

FOREIGN PATENT DOCUMENTS 6506245 11/1966 Netherlands ................. 52/406

Primary Examiner—James C. Cannon
Attorney, Agent, or Firm—Edward J. Sites

[57] ABSTRACT

A thermal insulation batt is provided which is comprised of a layer of bulk thermal insulation material; a vapor impervious thermoplastic facing sheet adhesively bonded to the layer of insulation material; paper tabs containing a fold line securely attached along each of longitudinal sides of the facing sheet or by having dual foldable paper strips enclosed within a folded back portion of the facing sheet so as to provide a deadfold characteristic for the tabs. The insulation batts are conveniently packaged with the dual tabs folded downwardly adjacent the facing sheet, and at installation the dual tabs are folded outwardly without snapback and are attached onto spaced apart structure members such as studs of a wall.

7 Claims, 2 Drawing Sheets

THERMAL INSULATION BATT

This invention relates to a thermal insulation batt, and more particularly concerns a thermal insulation batt having a moisture-impervious facing and mounting tabs arranged for use arranged in building construction.

BACKGROUND OF THE INVENTION

Thermal insulation batts which are comprised of a layer of low density bulk insulation, such as fiberglass insulation or mineral wool insulation and an asphalt coated paper facing, are well known in the art. The thermal insulation batts typically have tabs located along each longitudinal edge for attaching the batts to the building structural members such as studs or joists. For example, U.S. Pat. No. 1,694,949 issued to Lindsay discloses an early type of thermal insulation batt in which a bulk insulation material is completely enclosed within a moisture-impervious envelope and which further has flange portions for use in securing the batt in position. U.S. Pat. No. 2,263,201 issued to Wheeler et al discloses an insulation batt which is specifically designed for use in building construction and which has a paper facing sheet with integral edge flanges. U.S. Pat. No. 2,913,104 issued to Parker et al discloses thermal insulation batts made of asphalt coated paper or aluminum foil in which the side tabs are formed of a triple layer of the facing material. In the U.S. Pat. No. 4,233,791, issued to Kuhl et al and in U.S. Pat. No. 4,385,477 issued to Walls et al there is disclosed installations which utilize as a vapor barrier sheets made of thermoplastic materials such as polyester shrink films over batts of thermal insulation.

Because untreated paper facings generally do not provide a sufficient vapor barrier, asphalt coatings have been used in combination with the paper facings. The asphalt coating is used to both provide vapor barrier properties to the paper and also to adhere the layer of thermal insulation to the facing. The use of asphalt coated paper facing is not considered desirable because of the manufacturing cost and related problems associated with the required use of molten asphalt baths in the manufacturing process. In addition, the asphalt and the paper both substantially increase the flammability of the thermal insulation batt as well as adding a significant amount of potential fuel to the batt. To reduce the vapor permeability typically encountered with the untreated paper facings, insulation batts have heretofore been prepared using facings made of thermoplastic films. These batts, however, have not been successful because of the relatively low strength of the facings and more particularly because of the unsatisfactory folding characteristics of the tabs formed of the thermoplastic films. The tab portions made from the thermoplastic film tend to tear readily, causing propagation of the tears and a destruction of the vapor barrier of the thermal insulation batt.

SUMMARY OF INVENTION

The present invention provides an improved thermal insulation batt having a thermoplastic moisture-impervious facing and paper tabs along each longitudinal edge. The paper used to form the tabs provide excellent deadfold characteristics to the tabs. Deadfold characteristics refer to the property of the tab to be folded into a given position and remain in that position until it is folded into another position. Excellent deadfold characteristics are required for thermal insulation batts in order to allow for satisfactory packing and installation of the insulation batts.

BRIEF DESCRIPTION OF DRAWINGS

The invention will be further described with reference to the drawings, in which.

DETAIL DESCRIPTION OF THIS INVENTION

The thermal insulation batts of this invention are comprised of a layer of a bulk insulation material such as fiberglass, mineral wool or the like and a vapor-impervious facing in the form of a thin thermoplastic film which is adhesively bonded to the insulation layer. The width of the batt is generally selected so as to snugly fit between spaced structural building elements such as the studs of a building and the like. The thermoplastic facing is provided along its longitudinal edges with paper tabs formed of elongated paper strips which are attached or bonded along the edges of the thermoplastic facing so as to provide for a fold line in each of the tabs. In an alternate construction, the thermoplastic facing is made wider than the insulation strip and a paper strip is captured between the free edges of the thermoplastic facing by the edge being folded over itself so as to provide a fold line in the paper strip. This configuration provides a reinforced strip at each of the longitudinal edges of the batt which has deadfold characteristics and also serves as a mounting strip for securing the insulation batt into position.

When the insulation batt is manufactured, the paper tabs are folded back over or onto the thermoplastic facing and the insulation batt can then be wound on itself into a roll or bundled into bales for shipping purposes. The folding of the edge tabs back onto the thermoplastic facing or alternatively folding the tabs over the edges of the insulation layer allows the packages of the insulation to be significantly smaller and with more compact edges. Both of these properties are important as they facilitate the shipping and storage of the insulation prior to use. This is particularly important with a product such as insulation in that it is an extremely low density product so that volume charges correspond to the principal cost involved in shipping and storage. During the installation when it is desired to install the insulation batt, the paper tabs are folded back into an extended position and will remain in that position because of the deadfold characteristics imparted by the paper strips to the tabs. The paper tabs projecting beyond the edges of the insulation batt permit fasteners such as nails, staples and the like to be driven through the tabs into supporting members, such as the studs to hold the insulation batt in place. The paper tab allows the insulation to be securely held in place not subjected to the type of tearing typically encountered when the tabs are formed from thermoplastic film. The thermal insulation batt of this invention is characterized by having low water vapor permeability and also being especially suitable for easy installation into a building as well as being adapted for efficient shipping and storage.

Figure 1:
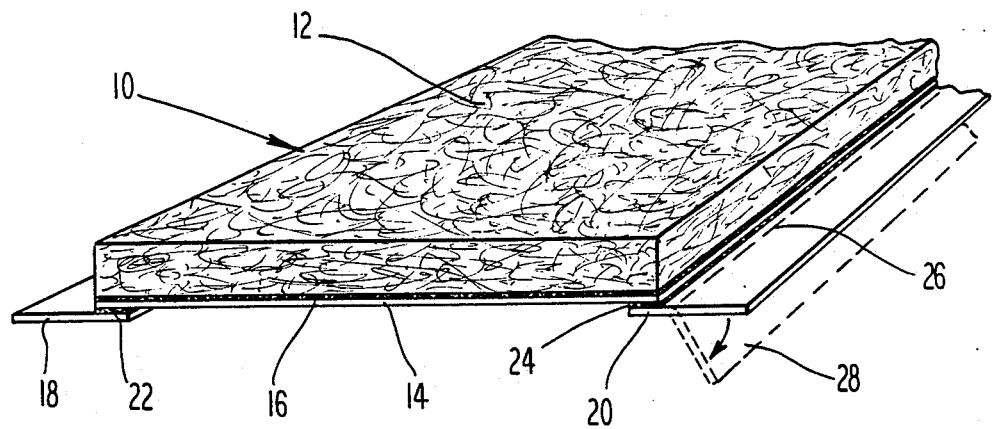
FIG. 1 shows a perspective view of one embodiment of an insulation batt constructed according to the invention, and having a thermoplastic facing sheet and paper tabs attached along the longitudinal sides of the batt.

As shown in FIG. 1, a thermal insulation batt 10 includes a layer of elongated bulk insulation material 12 such as fiberglass or mineral wool, which is adhesively bonded on one side onto a facing sheet 14 by a layer of adhesive material 16. Dual paper strips or tabs 18 and 20 are adhesively bonded to the facing sheet 14 along the opposite edges of the sheet 14 by adhesive layers 22 and 24. Each paper tab 18 and 20 overlaps the edge of the facing sheet 14 by at least an amount which is sufficient to provide a fold line in paper strip which has been typically about 0.125 inches. As is required for suitably packaging the batts, the dual tabs are each foldable along fold line 26 into a position as indicated at 28.

The insulation material 12 is usually conventional fiberglass or mineral wool insulation having low bulk density, and having dimensions of 1-6 nominal inches thick by 16-24 inches wide. The length is usually at least about 4 feet, or it can be provided as a roll up to about 30 feet long or longer. The facing sheet 14 is made of thin continuous, vapor-impervious film of thermoplastic material such as polyethylene and more particularly HMW-HOPE, polycarbonate and polyethylene terephalate having a thickness of 2-5 mils. Suitable adhesives for attaching the insulation layer onto the facing sheet include water based acrylic resins. The paper strips 18 and 20 are usually 0.025-0.040 inch thick and can be made of any paper material having deadfold characteristics, with 42 lb. basic weight Kraft type paper being preferred for reasons of good strength and relatively low cost. Each strip 18 or 20 contains fold line at 26 located adjacent the insulation material layer 12, such as spaced outwardly 0.060 to 0.0120 inch from the edge of the insulation material.

Figure 2:
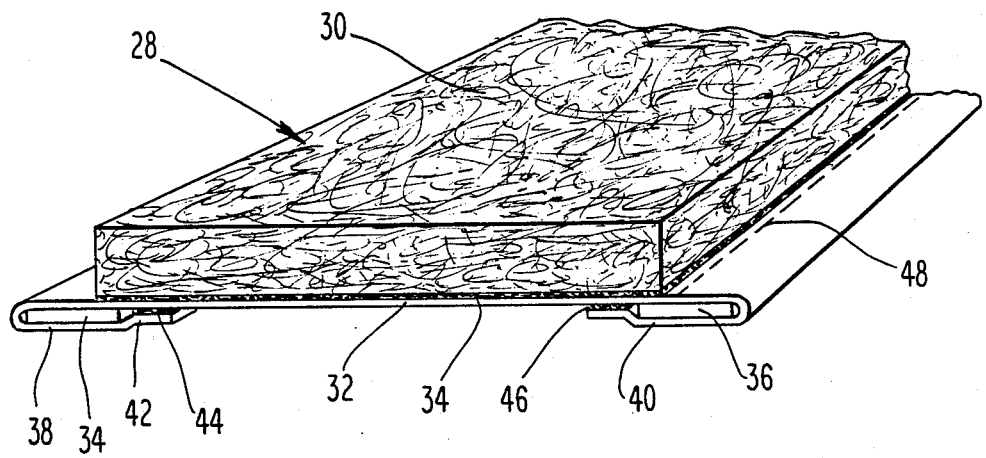
FIG. 2 shows an alternative embodiment of an insulation batt having a thermoplastic facing sheet which is folded back along alternate sides of the batt to enclose the paper strip tabs.

In an alternative embodiment of the invention as shown by FIG. 2, an insulation batt 28 includes a layer 30 of bulk thermal insulation material such as fiberglass or rock wool, which is adhesively bonded onto a thermoplastic vapor-impervious facing sheet 32 by an adhesive material layer at 34. The facing sheet 32 is made sufficiently wider than the thermal insulation layer 30 at each side so that the facing sheet 32 can be folded back against itself so as to enclose paper strips 34 and 36 each provided longitudinally along one side of the insulation layer 30. The folded back layer portions 38 and 40 of facing sheet 32 are adhesively bonded onto facing sheet 32, so as to provide an overlap as indicated at 42. Such folding back can be accomplished by adhesive bonds (not shown) located above sheet 32 adjacent the insulation layer 30, or can be provided by adhesive bond at 44 and 46 on the side opposite from insulation layer 30, depending upon the batt production procedures used. The combined sheet portion 32 and paper strips 34 and 36 are folded either upwardly or downwardly along a fold line 48 similarly as for the FIG. 1 embodiment. Because of the low resiliency for paper strip 34 and 36, the tabs formed by the combined folded facing sheet 32 and paper strips 34 and 36 will exhibit the desired deadfold characteristic without any significant undesired springback of the tabs relative to the insulation layer.

Figure 3:
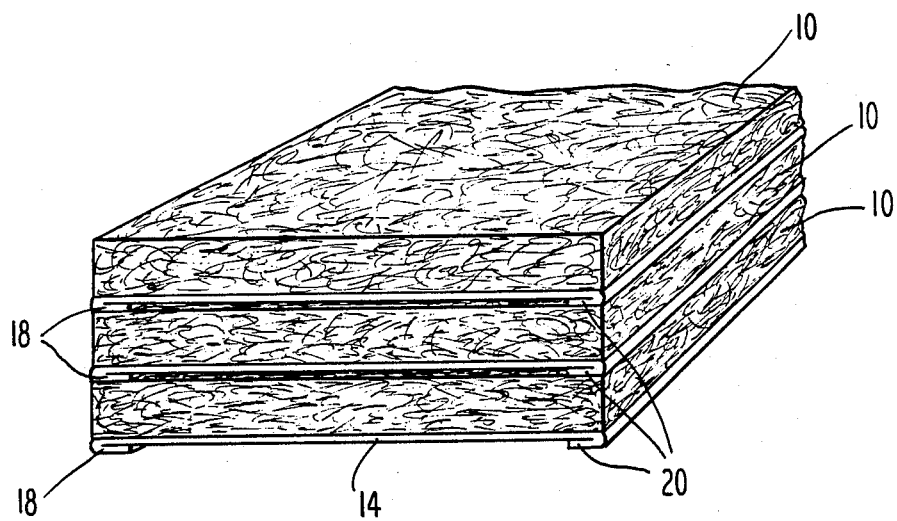
FIG. 3 shows a perspective view of layered insulation batts with the tabs folded down in position for packaging the batts.

A plurality of insulation batts 10 with the tabs 18 and 20 folded flush against the facing sheet 14 ready for compact insertion in a package are shown in FIG. 3.

The insulation batts 28 constructed according to the FIG. 2 embodiment may also be similarly packaged as shown in FIG. 3. Alternatively if desired, the insulation batts 10 or 28 can be constructed in long strips having a length of 20-50 feet and rolled into a bundle with the dual tabs folded inwardly similarly as shown in FIG. 3.

Figure 4:
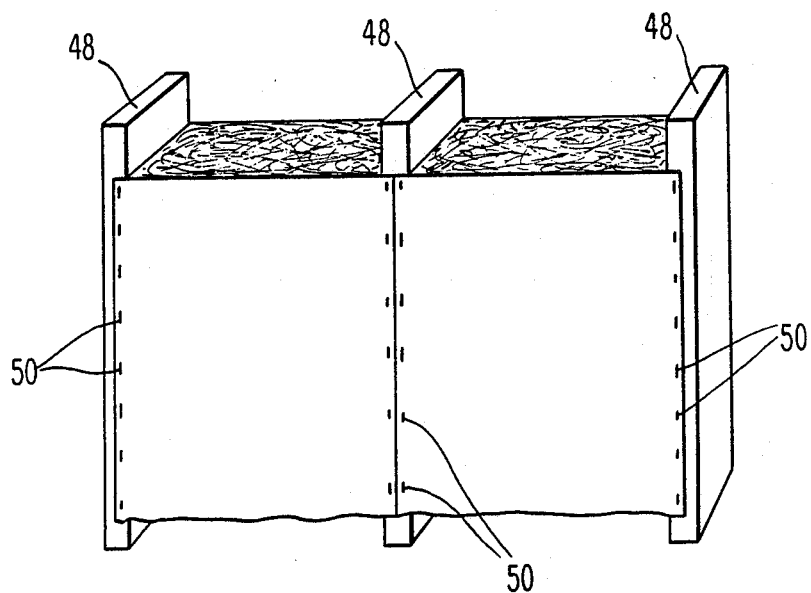
FIG. 4 shows insulation batts with the tabs folded outwardly and installed between structural members of a wall.

When it is desired to install the insulation batts 10 or 28 between support structures such as vertical wall studs or inclined ceiling rafters of a building, the batts are removed from the package per FIG. 3 and the dual tabs are folded outwardly without any noticeable springback. As shown by FIG. 4, the batts 10 or 28 are then placed between adjacent studs 48 of a building wall and attached in place by spaced fasteners 50 such as nails or staples driven through the tabs into the studs. Alternatively if desired the tabs can be attached to the studs by an adhesive layer provided on the inner surface of the tab (not shown).

The thermal insulation batts of this invention have a number of distinct advantages over both thermal insulation batts disclosed in the prior art and particularly the commonly used thermal insulation batts having asphalt coated paper facings. The polymeric film used as a facing in the thermal insulation batts of this invention is significantly less expensive both with regard to the material costs and manufacturing costs. In addition, since a relatively thin film of the thermoplastic is required, it can readily be compounded so as to be fire resistant, which significantly improves the quality of the insulation. The asphalt coated paper on the other hand adds a significant amount of highly undesirable combustible material to the overall insulation batt. The novel inclusion of the paper strips to form the paper tabs along the longitudinal edges allows nails or staples to be used to hold the batt securely in place while in addition the elongated strips of paper provide a reinforcement edge along the relatively weak polymer film used as the facing, hence, to allow the insulation to be more snugly installed; which is an advantage in building applications.

What is claimed is:

1. A thermal insulation batt comprised in combination of:
   a. an elongated insulation layer comprised of a low density insulation material, said layer having a predetermined width, a face surface, a back surface, and a first and second opposing longitudinal edges
   b. an elongated facing sheet of at least about said predetermined width, said facing sheet being formed from a water vapor impervious film of a thermoplastic material and being adhesively secured to and covering the face surface of the insulation layer
   c. first and second tab members being attached to the facing sheet in alignment with the respective first and second longitudinal edges of the insulation strip, each of said tab members, including an elongated paper strip containing a fold line adjacent to the longitudinal edge of the insulation layer and having deadfold characteristics sufficient for each tab member to remain in either a flat or folded back position so as to facilitate packaging of the thermal insulation and its subsequent installation by installing the tab members on supporting members, said elongated paper strips being substantially enclosed within said thermoplastic material.

2. The thermal insulation batt according to claim 1, wherein said dual members are each bonded onto the paper strip adhesively bonded along one longitudinal edge of said facing sheet so that the paper strip can be folded along the fold line located adjacent the longitudinal edges of the insulation material layer.

3. The thermal insulation batt according to claim 1, wherein said dual members are formed by a double thickness of the facing sheet which is folded back upon itself so as to enclose the elongated paper strip, wherein the fold line is located in the paper strip adjacent the longitudinal edges of the insulation strip.

4. The thermal insulation batt according to claim 1, wherein said facing sheet is made of polyethylene, polycarbonate, or polyethylene terephalate film.

5. The thermal insulation batt according to claim 1, wherein said paper strip has thickness of 0.030–0.050 inch.

6. The thermal insulation batt according to claim 2, wherein each said paper strip overlaps the facing sheet by a distance of about 0.25–0.5 inch.

7. The thermal insulation batt according to claim 3, wherein the folded facing sheet overlaps the insulation strip by about 0.25–0.5 inch.

* * * * *